United States Patent Office 3,560,169
Patented Feb. 2, 1971

3,560,169
MANNER OF PROCESSING PLUTONIUM-CONTAINING URANIUM FUEL FROM NUCLEAR REACTORS
Alf Harald Larsson, Stockholm, and Åke Valdemar Hultgren, Nykoping, Sweden, assignors to Aktiebolaget Atomenergi, Stockholm, Sweden
No Drawing. Filed Apr. 8, 1968, Ser. No. 719,736
Claims priority, application Sweden, Apr. 21, 1967, 5,676/67
Int. Cl. B01d 11/04
U.S. Cl. 23—339    3 Claims

ABSTRACT OF THE DISCLOSURE

In the recovery of plutonium and uranium from the core of a nuclear reactor by dissolving the fuel elements in an aqueous solution of, for instance, nitric acid, the highly irradiated central portions of the core are dissolved separately from those of the less irradiated peripheral portions to form separate first and second aqueous solutions which are separately extracted with organic solvents, the first solution with one selective to plutonium relative to uranium and fission products and the second one selective to plutonium and uranium relative to fission products. The residue of the first solution is combined with the second solution.

---

This invention relates to a process for the recovery of plutonium and uranium from a plurality of reactor fuel elements, which have been irradiated to different levels, e.g. in a fast reactor. Upon use of the fuel in a nuclear reactor for a considerable period of time it is burnt up or depleted to such an extent that the efficiency of the reactor requires fuel exchange. The fuel burnt up is treated for the recovery of uranium, and, in reactors where plutonium is formed, also of said element. As a rule the recovery is carried out in such a manner that the fuel elements, preferably decapsulated, are dissolved, usually in nitric acid, and the resulting aqueous solution is extracted with organic solvents for uranium and plutonium, especially solvents that dissolve uranium and/or plutonium selectively relative to the fission products. Uranium and plutonium are separated in different manners, generally by selective reduction of plutonium into a non-extractable form, but the separation may also be carried out by chromatography, and it is also possible to utilize the different solubility of uranium and plutonium compounds in different organic solvents, for instance, by extraction with a solvent which is selective to plutonium relative to uranium and present fission products.

In a reactor different fuel elements are subjected to irradiations of different strengths and, therefore, will be burnt out to different extents and in different manners. Previously certain consequences hereof have not been noticed but in the reprocessing, all the fuel elements have been treated without distinction. However, it has now been found that essential advantages are obtained if in the reprocessing attention is paid to the fact that the elements have been irradiated to different levels.

Thus, the object of the invention is to recover plutonium in a more efficient manner than previously from the fuel from one and the same reactor, if desired, in different isotope proportions. Another object of the invention is to adjust the processing to conditions of less criticality, particularly with reactors, such as fast reactors, in which high percentages of plutonium may arise.

The process of the invention comprises the steps of separately dissolving more irradiated fuel elements and less irradiated fuel elements, for instance in aqueous nitric acid solutions, and extracting the solution of the more irradiated material with a solvent being selective for plutonium relative to uranium and fission products, recovering plutonium from the extract, combining the residual solution with the solution of the less irradiated material, and extracting the combined solution with a solvent which is selective for plutonium and uranium relative to the fission products, the extract being then subjected to a uranium-plutonium separation. It is then convenient to convert the plutonium in the uranium-plutonium extract into a form insoluble in the uranium-plutonium selective solvent and to separate the plutonium from the uranium. The uranium is then recovered from the solvent now depleted of plutonium and the plutonium is recovered separately.

Thus, by the process of the invention it becomes possible, on one hand, to recover substantially only plutonium from the strongly irradiated material having a relatively high percentage of plutonium so that this plutonium can be recovered separately, if desired, and, on the other hand, to reduce the conditions of criticality in the rest of the processing to moderate conditions. Furthermore, it is possible for the dissolution or the extraction of plutonium from the solutions rich in plutonium to use special solvents which are selective for plutonium and which have a good resistance to the more severe irradiation conditions in the treatment of the solutions from the strongly irradiated material.

As a plutonium selective solvent there is advantageously used a tertiary or quaternary amine, such as trilauryl amine and trilauryl methyl amine, respectively, while as a uranium-plutonium selective solvent there is advantageously used tributyl phosphate, dibutyl carbitol, diamyl butyl phosphonate, or dibutyl phenyl phosphonate.

The invention can be carried out in the following manner. In one case it is calculated that 20 to 30% of the total fuel quantity of the reactor was to consider as strongly irradiated material in the inner reactor core and had received an irradiation of 100,000 mw. d. per metric ton. Thus, the outer reactor core comprised 70 to 80% of the total fuel quantity and was calculated having received an irradiation of about 5,000 mw. d. per metric ton, which means that the resulting average irradiation is 25,000 to 30,000 mw. d. per metric ton, i.e. of the same order of magnitude reached in low-enriched thermal power reactors. The fuel units from the inner reactor core which contained 20% of plutonium were dissolved in nitric acid and extracted with trilauryl amine. The extract solution was washed with nitric acid and plutonium was reextracted with acetic acid and the plutonium obtained was recovered in the accepted usual manner. The residual solution from the extraction with trilauryl amine was combined with the nitric acid solution from the fuel units of the outer reactor core, which units contained 2 to 4% plutonium, and the combined aqueous solution was extracted with tributyl phosphate which dissolved uranium and plutonium, while the fission products accompanied the nitric acid solution. The organic solution was washed with nitric acid and about 5% of uranium and plutonium were entrained with the wash liquid which was recycled to the extraction with tributyl phosphate. The organic solution washed in this manner was subjected to reextraction. Uranium remained in the tributyl phosphate solution from which uranium was recovered by reextraction with water, while extracted plutonium was transferred to the plutonium processing plant. There plutonium from the outer portion of the reactor core may be processed together with plutonium from the inner portion of the reactor core, or be processed separately so that the plutonium is obtained in different isotope proportions.

By the foregoing procedure several advantages are gained. Thus, the handling is simplified from a critically point of view since, relative to the outer reactor core, the requirements in the sense of criticality are considerably more severe for the inner reactor core, which has an essentially higher content of fissionable material (15 to 25%) and also represents a smaller working volume than is required for the outer reactor core which has a low content of fissionable material (2 to 4%) and represents a substantially larger volume. Another gain is that the irradiation of the extraction agents used is adapted to their resistence to radiolytic decomposition. For the inner reactor core, which is consumed to a high degree and has consequently a high concentration of radioactive fission products, extraction agents (tertiary or quaternary amine) have been suggested which are substantially more resistant to irradiation than those suggested for the outer reactor core (tributyl phosphate, diamyl butyl phosphate, and the like). By admixing the residual solution obtained from the processing of the inner reactor core with the solution obtained from the outer reactor core a lower concentration of fission products and a lower radiolytic stress on the solvent used are encountered. Moreover, the uranium from the inner reactor core is decontaminated and recovered, and possible plutonium losses from the processing of the inner reactor core are reduced by this second extraction together with the outer reactor core.

Finally the separate processing of the inner and the outer portions of the reactor core also gives a possibility of obtaining different plutonium products. This is valuable especially for recycling plutonium in a mixed system of thermal and fast reactors as the plutonium from the outer reactor core has a considerably higher content of Pu 239, which is fissionable in thermal reactors, than the inner.

What is claimed is:

1. A process for the recovery of plutonium and uranium from a plurality of fuel elements which have been irradiated to different burn-up levels in a fast breeder reactor, which comprises:
   (A) separately subjecting to dissolution in nitric acid fuel element irradiated to a high burn-up level and fuel elements irradiated to a low burn-up level, to form two separate nitric acid solutions;
   (B) subjecting the solution of the high burn-up fuel to a single cycle extraction with an organic solvent selected from the class of tertiary and quaternary amine nitrates dissolved in an organic diluent, whereby to produce an organic product stream containing substantially all of the plutonium and a residual aqueous solution containing substantially all of the uranium and fission products;
   (C) stripping said organic extract with an aqueous solution containing complexing-reducing agents to transfer substantially all of the plutonium to said aqueous solution;
   (D) combining the residual aqueous solution of step (B) with the solution of the low burn-up fuel of step (A), and subjecting the combined aqueous solution to a single cycle extraction with tributyl phosphate in a hydrocarbon diluent, whereby to produce an organic extract containing substantially all of the uranium and plutonium originally present in the combined aqueous solution and an aqueous raffinate containing substantially all of the fission products;
   (E) subjecting the organic extract from step (D) to a partitioning operation by selectively reducing the plutonium to the trivalent state with an aqueous solution of ferrous sulfamate, to form an aqueous extract of plutonium and a residual organic solution of uranium;
   (F) subjecting the residual organic solution from step (E) to reextraction with a solvent selected from the group consisting of water and very dilute nitric acid, to form an aqueous solution of substantially all of the uranium; and
   (G) subjecting the plutonium from step (C) and the plutonium from step (E) separately or combined to further extraction purification cycles with solvents as given in step (B) or step (D).

2. The process of claim 1, characterized in that the plutonium selective solvent is a tertiary or a quaternary amine, such as trilauryl amine and trilauryl methyl amine, respectively.

3. The process of claim 1, characterized in that the uranium-plutonium selective solvent is tributyl phosphate, dibutyl carbitol, diamyl butyl phosphonate, or dibutyl phenyl phosphonate.

References Cited

UNITED STATES PATENTS

| | | | |
|---|---|---|---|
| 3,359,078 | 12/1967 | Alter et al. | 23—340 |
| 3,328,133 | 6/1967 | Ishihara et al. | 23—340 |
| 3,154,377 | 10/1964 | Chesne | 23—340 |
| 3,092,446 | 6/1963 | Morgan et al. | 23—341 |
| 2,951,740 | 9/1960 | Hopkins | 23—341 |

CARL D. QUARFORTH, Primary Examiner

F. M. GITTES, Assistant Examiner

U.S. Cl. X.R.

23—324, 340, 341